United States Patent
Francescutti et al.

(10) Patent No.: US 6,778,373 B2
(45) Date of Patent: Aug. 17, 2004

(54) RECTIFIER CIRCUIT SUITED TO POWER FACTOR CORRECTION

(75) Inventors: Ugo Francescutti, Ponzano Veneto (IT); Felix Franck, Munich (DE)

(73) Assignee: Patent-Treuhand-Gesellschaft für Elektrische Glühlampen mbH, München (DE)

( * ) Notice: Subject to any disclaimer, the term of this patent is extended or adjusted under 35 U.S.C. 154(b) by 222 days.

(21) Appl. No.: 10/070,887

(22) PCT Filed: Aug. 10, 2001

(86) PCT No.: PCT/DE01/03076
§ 371 (c)(1),
(2), (4) Date: Mar. 7, 2002

(87) PCT Pub. No.: WO02/19505
PCT Pub. Date: Mar. 7, 2002

(65) Prior Publication Data
US 2002/0122325 A1 Sep. 5, 2002

(30) Foreign Application Priority Data
Aug. 28, 2000 (DE) .......................................... 100 42 141

(51) Int. Cl.[7] .................................................. H02H 1/00
(52) U.S. Cl. ........................... 361/113; 315/247; 363/44
(58) Field of Search ................... 361/18, 113; 323/207, 323/218, 219, 233, 363, 365, 901, 908; 363/39, 44, 45, 46, 47; 315/200 R, 205, 206, 227 R, 247, 307

(56) References Cited

U.S. PATENT DOCUMENTS 5,459,375 A * 10/1995 Nilssen ........................ 315/247
5,959,849 A     9/1999 Batarseh et al.
5,986,898 A    11/1999 Meitzner et al.
6,005,780 A    12/1999 Hua

FOREIGN PATENT DOCUMENTS

DE             197 47 801 A1     5/1999

OTHER PUBLICATIONS

Maset et al, "Harmonic reduction in low–cost power supplies", Power Electronics Congress, 1996, Technical Proceedings, CIEP '96., V IEEE, International Cuernavaca, Mexico 14–17, Oct. 1996, New York, NY USA, IEEE; US; Oct. 14, 1996; pp. 15 21; XP010244348; ISBN: 0–7803–3633–X.

Jiang Lee Yimin et al, "Single–stage single–phase parallel power factor correction scheme", Power Electronics Specialists Conference, PESC '94 Record., 25th Annual IEEE Taipei, Taiwan Jun. 20–25, 1994, New York, NY USA, IEEE; Jun. 20, 1994; pp. 1145–1151; XP010121361; ISBN: 0–7803–1859–5.

* cited by examiner

*Primary Examiner*—Ronald Leja
(74) *Attorney, Agent, or Firm*—Cohen, Pontani, Lieberman & Pavane

(57) ABSTRACT

A rectifier circuit matched for power factor correction. A first diode (D1), a second diode (D2), a third diode (D3) and a fourth diode (D4) are in a bridge arrangement. A first pole (10) and a second pole (12) of the bridge arrangement are connected to a source (U) which has at least one AC voltage component. An inductance (L1) is arranged in series with the third pole (14) or the fourth pole (16) of the bridge arrangement. A capacitance (C1) is connected between the first pole (10) and the second pole (12), and two of the four diodes (D1, D2, D3, D4) are in the form of fast diodes.

5 Claims, 6 Drawing Sheets

RECTIFIER CIRCUIT SUITED TO POWER FACTOR CORRECTION

This application is a U.S. National Phase Application under 35 USC 371 of International Application PCT/DE01/03076 (not published in English) filed Aug. 10, 2001.

FIELD OF THE INVENTION

The present invention relates to a rectifier circuit matched for power factor correction, comprising a first diode, a second diode, a third diode and a fourth diode in bridge arrangement, an inductance and a capacitance, with a first pole and a second pole of the bridge arrangement being connected to a source which has at least one AC voltage component, and the inductance being arranged in series with the third pole or the fourth pole.

BACKGROUND OF THE INVENTION

Such apparatuses are known from the prior art and are shown by way of example in FIGS. 1a to 1d.

The problem on which the invention is based will be presented with reference to the circuits in FIGS. 1a to 1d. From 2001 onward, it is a requirement of IEC 1000-3-2 that mains current harmonics also be observed for systems with mains power of less than 25 W. An ever growing number of lamp types requires the use of electronic equipment whose second stage downstream of the spark suppression filter is a mains rectifier. In order to observe IEC 1000-3-2, power factor correction, PFC for short, is required. FIG. 1a shows a mains rectifier known from the prior art which is designed for subsequent power factor correction. In this case, the mains rectifier comprises four diodes D1 to D4 in bridge arrangement. The bridge arrangement comprises a first pole 10, a second pole 12, a third pole 14 and a fourth pole 16, the poles 10 and 12 being connected to a source which has at least one AC voltage component. The poles 14 and 16 are connected to one another via a capacitance C1, the capacitance C1 preferably being small, in particular in the region of a few dozen nF. The pole 16 is connected to ground, while the pole 14 is first followed by a diode D5, and then by an inductance L1. The arrow 18 points in the direction of the rest of the circuit, with, in particular, a relatively large storage capacitance coming next in the direction of the arrow, which storage capacitance then supplies the equipment with DC voltage. It is particularly advantageous, as shown in the present case, for the mains rectifier to be connected to an inductance so that it is suitably loaded. The PFC circuit also contains at least one switching element (not shown) switching at a high frequency, which switching element controls the mains current such that it becomes as proportional as possible to the voltage, that is to say sinusoidal in most cases.

A drawback for the operation of PFC is if the switching voltages of this high frequency switching element rise via the inductance L1 and reverse currents flow into the mains rectifier—the wrong way round, so to speak. Specifically, the result of this would be that the capacitor C1 is charged by the reverse current, and a current hole therefore arises in the current drawn from the mains, i.e. no current is drawn for a particular period of time. This is possible because the duration of the turnoff reverse currents in the slow mains diodes D1 to D4 corresponds to approximately half a period duration of the switching element switching at high frequency in the PFC circuit. As a countermeasure, the output of the mains rectifier having the diodes D1 to D4 has an additional, albeit fast, diode D5 connected to it in series with the PFC inductance, downstream of the small capacitance C1.

The block 20 combines the elements which make up the PFC circuit.

FIG. 1b shows a slightly modified variant in which the fast diode D5 is connected between the pole 16 and the ground, while the inductance is connected directly to the pole 14. In the circuit shown in FIG. 1c, the pole 16 is connected to ground via the inductance L1, while the fast diode D5 is arranged at the pole 14. In the circuit shown in FIG. 1d, the series circuit comprising the fast diode D5 and L1 is arranged between pole 16 and ground.

SUMMARY OF THE INVENTION

On the basis of these circuits known from the prior art, the object on which the present invention is based is to develop a generic rectifier circuit such that it can be produced using fewer components, in particular that the diode D5 can be dispensed with.

A rectifier circuit matched for power factor correction. A first diode (D1), a second diode (D2), a third diode (D3) and a fourth diode (D4) are in a bridge arrangement. A first pole (10) and a second pole (12) of the bridge arrangement are connected to a source (U) which has at least one AC voltage component. An inductance (L1) is arranged in series with the third pole (14) or the fourth pole (16) of the bridge arrangement. A capacitance (C1) is connected between the first pole (10) and the second pole (12), and two of the four diodes (D1, D2, D3, D4) are in the form of fast diodes.

The invention is based on the idea that the diode D5 can be replaced by virtue of two of the four diodes of the rectifier being in the form of fast diodes, with the capacitance C1 then needing to be connected between the first pole and the second pole. This measure eliminates the need for the fifth diode. Another advantage is obtained by virtue of the capacitance simultaneously acting as x-capacitor for spark suppression.

In one particularly preferred embodiment, the capacitance C1 is formed by a first capacitance element and a second capacitance element connected in series, the junction point between the first capacitance element and the second capacitance element being connected to the third pole or to the fourth pole of the bridge arrangement. This measure affords the advantage that it allows the individual potentials to be defined even more reliably with respect to RF voltage. In this context, the junction point between the two capacitance elements is preferably connected to the pole which is common to the two slow diodes.

Irrespective of whether or not the capacitance C1 is split into capacitance elements, the following four particularly preferred embodiments can be implemented:

In this regard, the first diode may be connected between the first pole and the third pole, the second diode may be connected between the first pole and the fourth pole, the third diode may be connected between the fourth pole and the second pole and the fourth diode may be connected between the second pole and the third pole. The first embodiment is then distinguished in that the first diode and the fourth diode are in the form of fast diodes, the inductance is arranged in series with the third pole, and the fourth pole is connected to ground. In the second embodiment, the second diode and the third diode are in the form of fast diodes, the inductance is arranged in series with the third pole, and the fourth pole is connected to ground. In the third embodiment, the first diode and the fourth diode are in the form of fast diodes, the inductance is arranged in series with the fourth pole, and the fourth pole is connected to ground via the inductance. In the fourth embodiment, the second diode and the third diode are in the form of fast diodes, the inductance is arranged in series with the fourth pole, and the fourth pole is connected to ground. The diodes which do not explicitly need to be in the form of fast diodes can be in the form of slow diodes.

In this context, fast diode means that the duration of the turnoff reverse current is from 10 ns to 100 ns. A slow diode is referred to when the duration of the turnoff reverse current is between 1 $\mu$s and 20 $\mu$s.

BRIEF DESCRIPTION OF THE DRAWINGS

A plurality of exemplary embodiments of the invention are described in more detail below with reference to the appended drawings, in which.

DETAILED DESCRIPTION OF THE DRAWINGS

Figure 1A:
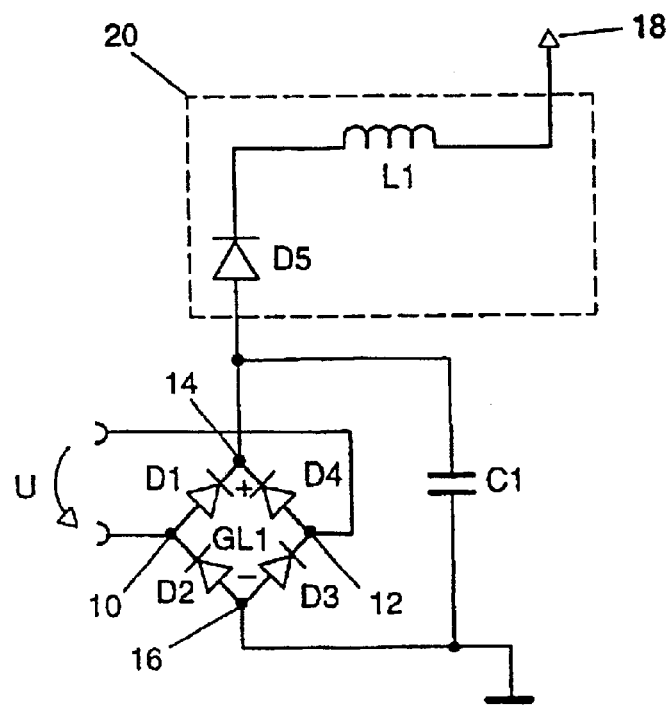
FIGS. 1a to 1d show four rectifier circuits matched for power factor correction and known from the prior art.
Figure 1B:
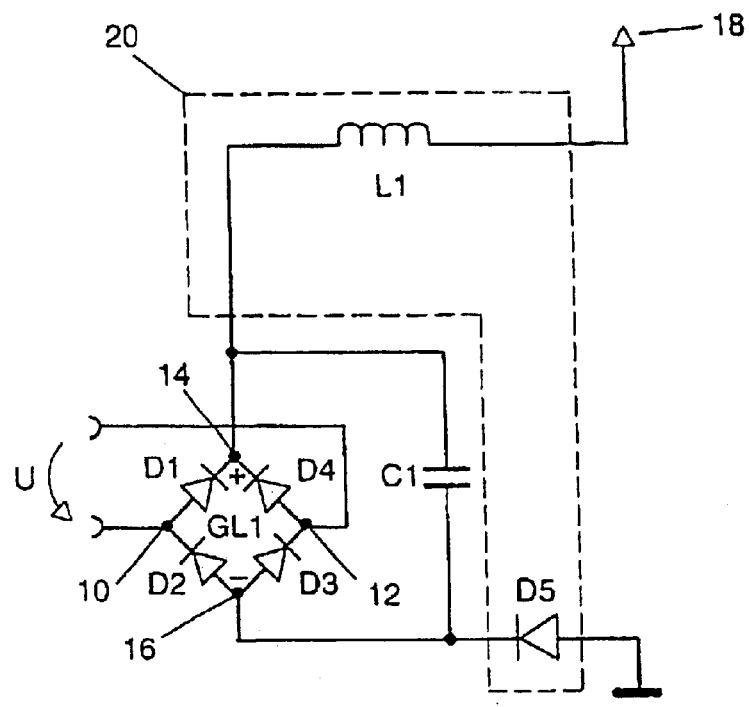
Figure 1C:
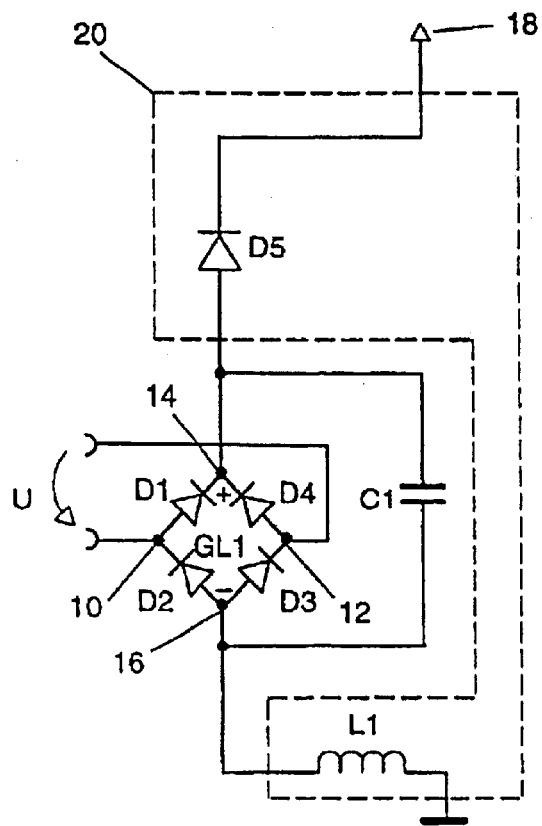
Figure 1D:
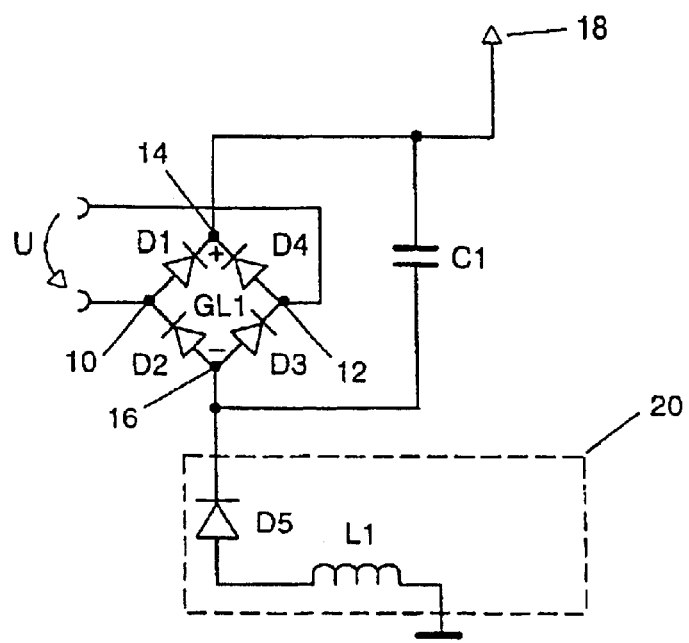
Figure 2A:
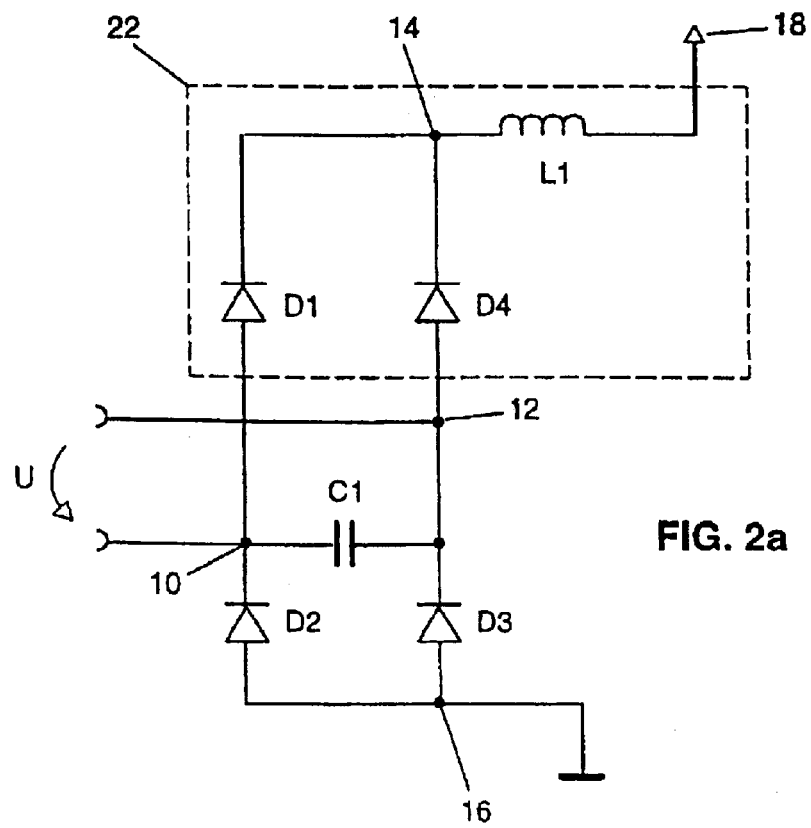
FIGS. 2a to 2d show four inventive rectifier circuits, matched for power factor correction, having a single capacitance C1.
Figure 2B:
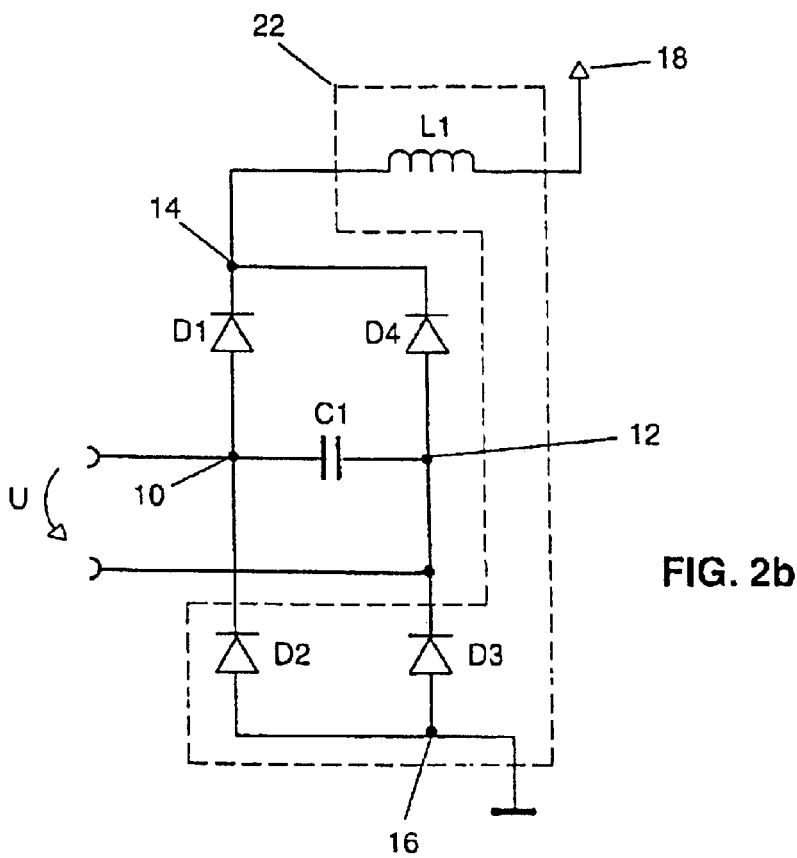
Figure 2C:
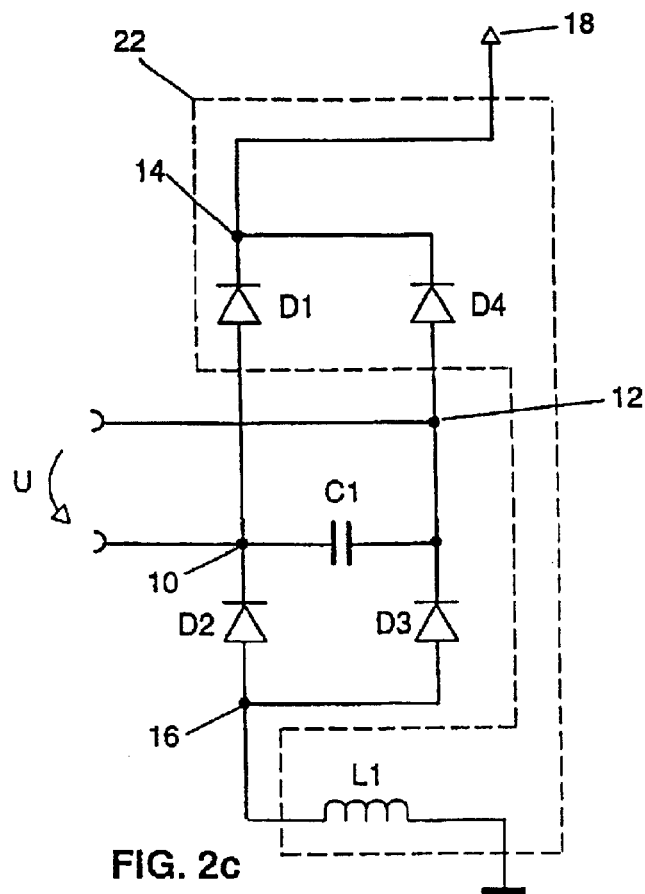
Figure 2D:
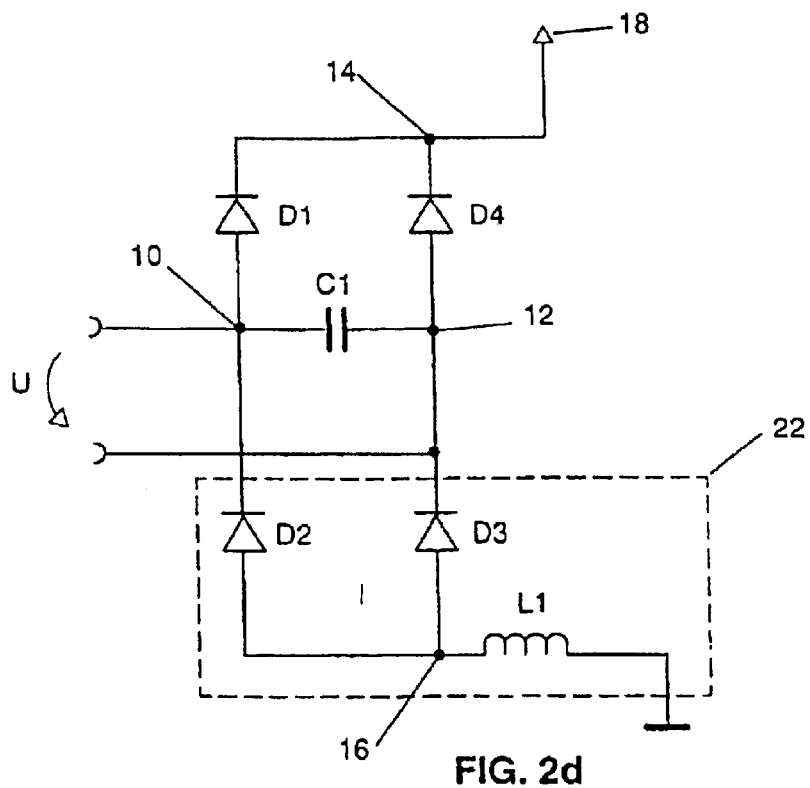

The inventive embodiments are shown in FIGS. 2a to 3d by way of example. In this case, the embodiments shown in FIGS. 2a and 3a originate from FIG. 1a, the embodiments shown in FIGS. 2b and 3b originate from FIG. 1b, the embodiments shown in 2c and 3c originate from FIG. 1c, and the embodiments shown in 2d and 3d originate from FIG. 1d. Components in FIGS. 2a to 2d and FIGS. 3a to 3d which correspond to components in FIGS. 1a to 1d have been provided with the same reference symbols and are therefore not explained again.

The embodiments in FIGS. 2a to 2d differ from the embodiments in FIGS. 1a to 1d in that, in each case, the two diodes which are combined with the inductance L1 in the block 22 as components of the PFC circuit are in the form of fast diodes, and the capacitor C1 is now arranged between the first pole 10 and the second pole 12.

Figure 3A:
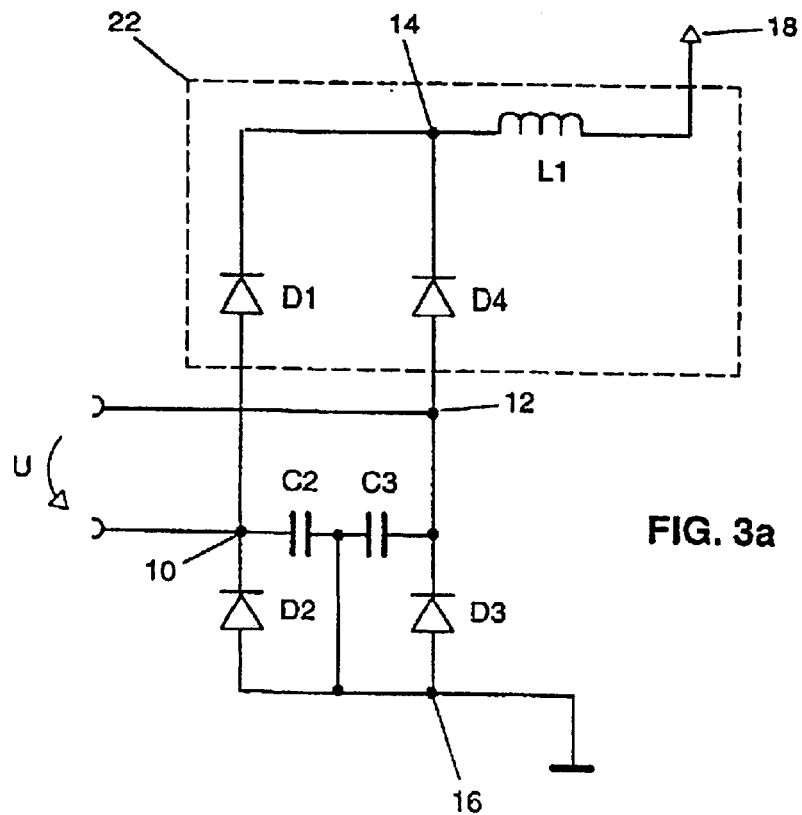
FIGS. 3a to 3d show four further inventive rectifier circuits, matched for power factor correction, in which the capacitance C1 is produced by two capacitance elements, the midpoint of the two capacitance elements being connected to the third or to the fourth pole of the bridge arrangement.
Figure 3B:
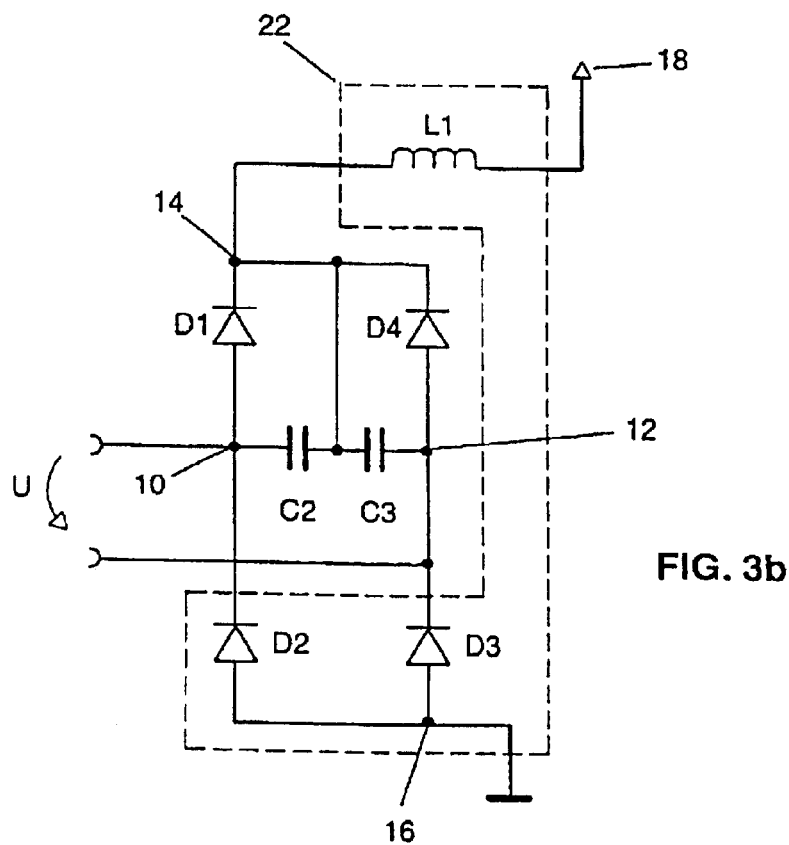
Figure 3C:
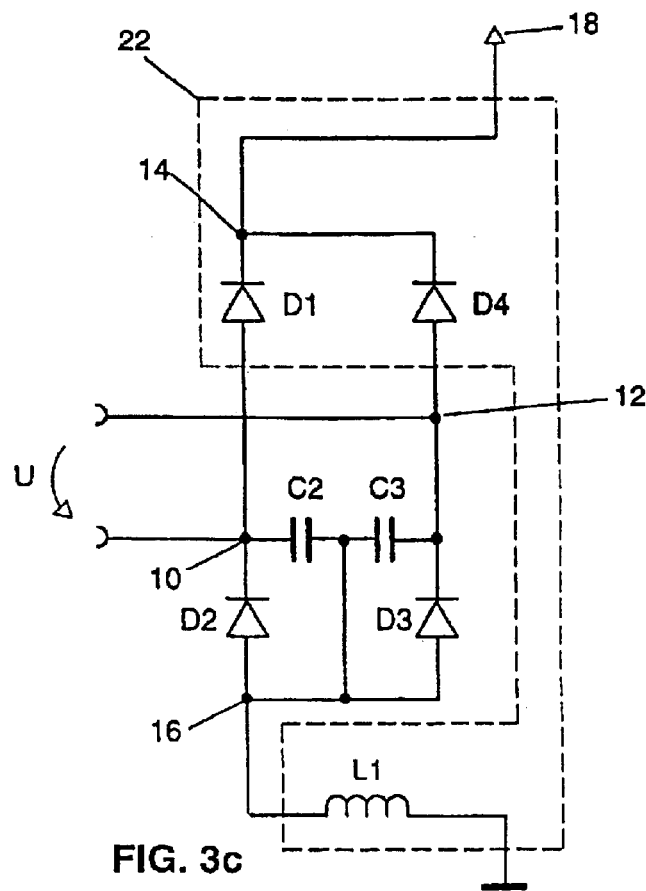
Figure 3D:
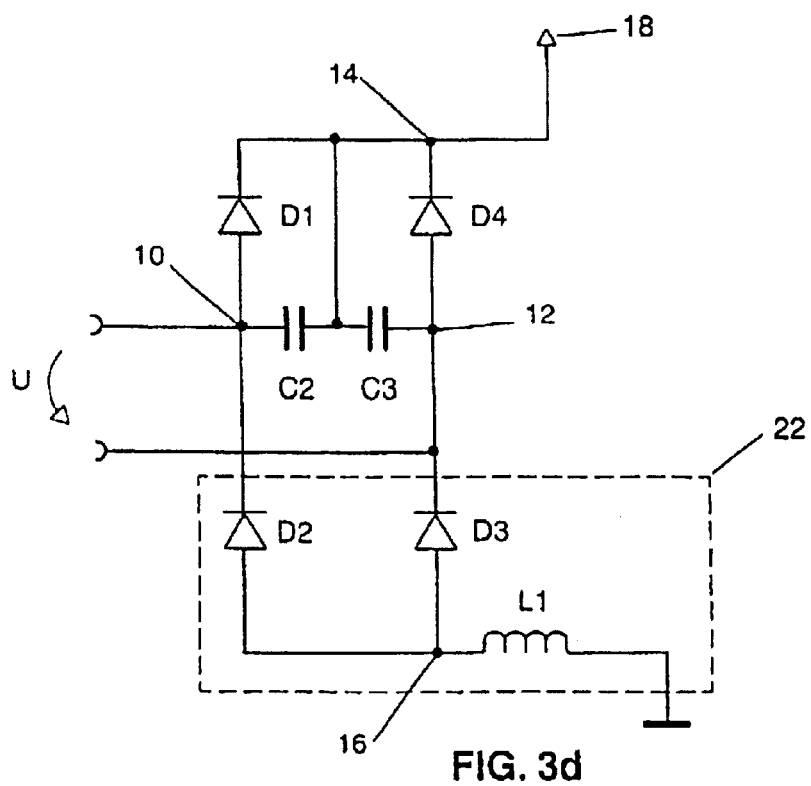

The embodiments shown in FIGS. 3a to 3b differ from the embodiments in FIGS. 2a to 2d in that the capacitance C1 is produced by two capacitance elements C2 and C3, the junction point between the capacitance elements C2 and C3 being connected to the pole common to the two diodes which do not need to be in the form of fast diodes, i.e. the diodes which are not arranged in the block 22.

What is claimed is:

1. A rectifier circuit matched for power factor correction, the circuit comprising:

a first diode, a second diode, a third diode and a fourth diode connected to form a bridge, the bridge having a first pole between the first and second diodes, a second pole between the third and fourth diodes, a third pole between the first and fourth diodes, and a fourth pole between the second and third diodes;

a source of AC voltage applied across the first and second poles;

an inductance coupled to one of the third and fourth poles;

wherein, with the first and fourth diodes being a first pair of diodes and the second and third diodes being a second pair of diodes, one of the first and second pairs of diodes is a pair of fast diodes; and first and second capacitors connected in series between said first and second poles, and having a junction point therebetween, said junction point being connected to the one of the third pole and the fourth pole which lies between the pair of said first and second pair of diodes other than the pair of fast diodes.

2. The rectifier circuit of claim 1, wherein said first pair of diodes are fast diodes;

said inductance is coupled to said third pole; and said fourth pole is connected to ground.

3. The rectifier circuit of claim 1, wherein said second pair of diodes are fast diodes;

said inductance is coupled to said third pole; and said fourth pole is connected to ground.

4. The rectifier circuit of claim 1, wherein said first pair of diodes are fast diodes;

said inductance is coupled to said fourth pole; and said fourth pole is connected to ground via said inductance.

5. The rectifier circuit of claim 1, wherein said second pair of diodes are fast diodes;

said inductance is coupled to said fourth pole; and said fourth pole is connected to ground via said inductance.

* * * * *